Patented Dec. 7, 1943

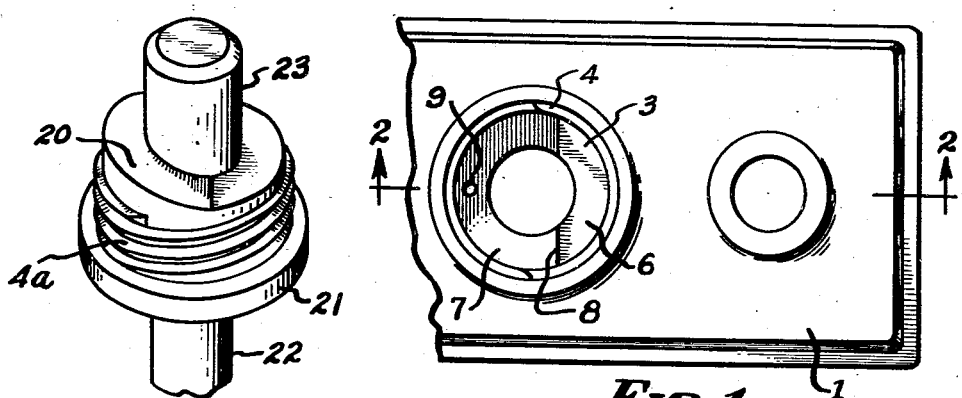
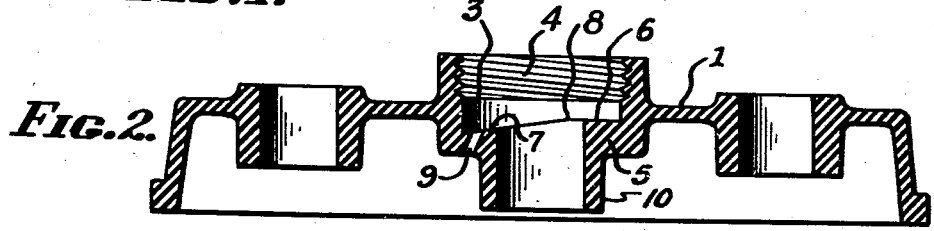
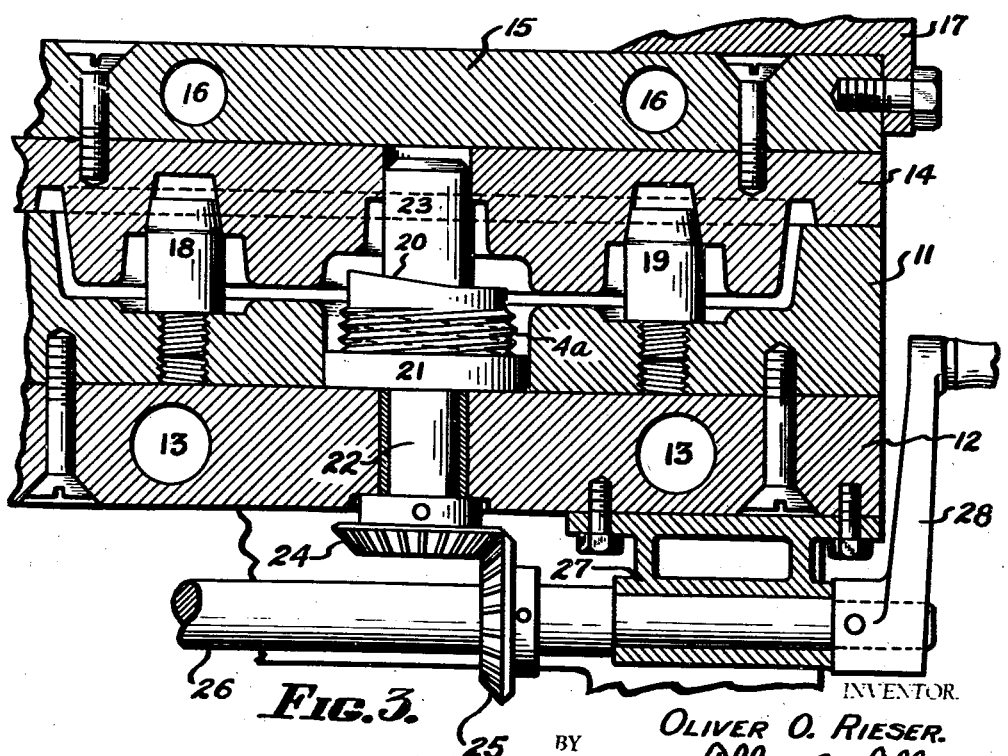

2,336,423

UNITED STATES PATENT OFFICE 2,336,423

MANUFACTURE OF STORAGE BATTERY CELL COVERS HAVING NONOVERFILL DEVICES

Oliver O. Rieser, Oak Park, Ill., assignor to The Richardson Company, Lockland, Ohio, a corporation of Ohio Application December 23, 1939, Serial No. 310,766

3 Claims. (Cl. 18—42)

In the copending application of Keller Serial Nos. 276,826 filed June 1, 1939, and 304,590 filed November 15, 1939, and in my copending applications Serial Nos. 288,748 filed August 7, 1939, and 304,772 filed November 16, 1939, cell covers having various forms of non-overfill devices have been set forth. Certain of these devices included weight actuated valve members which occupy one position when the filler cap is removed, in which position they close a gas vent opening. The valve members occupy another position when the filler cap is in place, thus venting the space beneath the cell cover. These various styles in general contemplate a cell cover having a filler opening in the form of a well with a perforated bottom, there being a tubular extension directed downwardly from the bottom of the well and terminating at a desired maximum electrolyte level. The bottom of the well, however, does not lie in a single flat plane.

It is an object of my invention to provide a means and method for moulding cell covers of this general type, which means and method are simple, inexpensive, and which do not complicate the manufacturing program or require extra time or operations.

In the ordinary procedure for forming cell covers the filler well is moulded by a threaded plug in one of the mould members. This plug can be turned out of the well after the moulding is completed. Problems are however, introduced when it is attempted to mould by means of such plug an irregular, non-planar conformation on the bottom of the well, as will be readily understood. An object of my invention is to provide a means and method for the making of the new type cell covers comparable in simplicity to the usual mode of manufacture and involving only the same series of operations.

These and other objects of my invention which will be set forth hereinafter or will be apparent to one skilled in the art upon reading these specifications, I accomplish by that certain construction and arrangement of parts and in that certain procedure of which I shall now describe an exemplary embodiment. Reference is made to the drawing wherein:

Figure 1 is a partial plan view of a cell cover of the type to which I have made reference.

Fig. 2 is a longitudinal sectional view of the entire cover taken along the lines 2—2 of Fig. 1

Fig. 3 is a vertical section through a portion of a mould for making cell covers.

Fig. 4 is a perspective view of a threaded plug.

In this application I shall specifically refer to that type of cell cover wherein the bottom of the well is formed with its surface in two angularly related planes, the meeting line of which forms a fulcrum for a weight actuated valve member. By reference to the applications set forth hereinabove it will be understood that this particular conformation of the bottom of the well is not the only one currently employed in structures of this class; but it will also be clear to the skilled worker in the art how the principles herein taught are applicable to other conformations of the bottom of the well.

Referring to Figs. 1 and 2, I have illustrated a cell cover 1 of usual external form having openings for the terminal posts of plate assemblies in a cell to be covered thereby. The cell cover has a filler opening with walls defining a well 3. These walls are threaded as at 4. The well has a bottom portion 5, the surface of which is formed in two intersecting planes 6 and 7, which planes are angularly related and have a meeting line at 8, which in this instance serves as a fulcrum for a weight actuated valve member in the form say of a perforated disc or washer of antimonial lead. The plane 7 is the larger of the two planes so that when the filler cap is removed from the cell the valve member lies against this plane, and closes an opening 9 through the bottom of the well 3. This is a gas vent opening; and it is located fairly high within the hollow body of the cell cover. From the bottom of the well there depends a tubular extension 10, the lower end of which is located at the desired maximum electrolyte level. The hole in the washer permits the cell to be filled through the tubular extension 10 while the washer is closing the gas vent opening 9. As a consequence, during filling, since the perforation 9 is closed off, as soon as the electrolyte reaches the bottom of the tubular extension 10, it will rise rapidly therein thus giving an overfill signal. If the weight operated valve member has sufficient mass, overfilling is prevented. When the filler cap is in place, it contacts the valve member and rocks it on the fulcrum 8 toward the plane 6. This opens or uncovers the perforation 9 and permits the escape of gas from above the electrolyte level.

In the practice of my invention the mould for forming the cell covers is of usual type consisting of a female mould member 11 fastened to a plate 12, perforated as at 13, for the passage of heating and cooling fluids. The mould also comprises a male member 14 also attached to a plate 15 perforated as at 16, for the passage of heating and cooling fluids. The mould members 11 and 14 are preferably fastened respectively to the temperature control plates 12 and 15 by screws as shown. In some operations the mould assembly is made removable from the press. In other operations the male mould member is attached to the ram of the press or, where a gang press is employed, either to the ram or to the intermediate support so that when the press is opened the male member will be raised and withdrawn from the moulded articles which remain in the other mould member. For the sake of illustration I have shown the male mould assembly 14, 15 attached to the ram 17 of the press.

The respective mould members are so shaped internally as to produce a cell cover of the desired configuration. I have shown the female mould member provided with pins 18 and 19 for moulding the perforations in the terminal lug passageways, and also with a threaded plug shown in perspective in Fig. 4. This plug, in the particular form shown, embodies a threaded moulding portion 4a, a portion 20 for moulding the bottom of the well, a collar 21 for moulding the top of the filler well extension and for preventing moulding substances from going down and around the plug into the bearing thereof, and a shaft portion 22 extending through a perforation in the temperature control plate 12. There is an upper shaft-like extension 23 on the plug which moulds the perforation in the tubular extension 10.

In some installations the plug extension 22 may have its end squared or slotted, or otherwise prepared for engagement by a tool whereby the plug may be removed from the moulded article even after the moulded article is removed from the female mould. In the particular exemplary embodiment, however, I have shown the end of the shaft 22 as provided with a bevel gear 24 meshing with another bevel gear 25 on a shaft 26. The shaft is suitably journaled as at 27, and may be provided with a handle 28.

The threaded plug, while rotatable, is not axially movable in the mould assembly. As a consequence, after the moulding of an article and the withdrawal of the male mould member, the article remains in the cavity of the female mould but is forced therefrom upon the rotation of the threaded plug. It will be understood that moulds for cell covers are usually multiple moulds in which large number of cell covers are formed in one press operation. In the drawing of this application I have illustrated but one mould cavity, but it will be understood that the mould assembly may and usually does contain many such cavities. In the particular embodiment illustrated, the shaft 26 may be common to a line of mould cavities and may be connected to the threaded plugs by means of suitable beveled gearing; and other shafts parallel and geared to the shaft 26 so as to be rotatable therewith, may be connected by beveled gearing to other lines of mould cavities. Where the gearing arrangement illustrated is employed, it will be understood that the female mould part with its temperature control plate 12, is supported sufficiently above the platen of the press to clear the shafting and gearing.

With a non-planar configuration of the top of the portion 20 of the threaded plug it would ordinarily be impossible to turn the threaded plug out of the moulded article without destruction of the article. I solve this problem by one of two factors, or preferably a combination of both as follows: I have found first that it is possible to select a time of removal at which the hard rubber composition from which the cell covers are made, while thoroughly vulcanized, is yet warm and sufficiently resilient to accept some displacement without rupture. Also by employing a double lead thread as illustrated for the part 4a of the threaded plug, I can make the axial movement of the threaded plug relative to the moulded article substantially equal to the variation of the part thereof which moulds the bottom of the well from a plane normal to the axis of the plug. For some styles of cell covers the resilient give of the material is sufficient to permit removal of the plug. For other types of cell covers the double lead thread can be made to provide an equal or greater axial movement than required by the bottom irregularities, and for still other types of cell covers the combination of the two factors is sufficient to permit ready removal of the plug.

While this may vary somewhat with different types of hard rubber compositions, in the composition currently employed by me, I have found sufficient resilience in the cured material to permit removal of the plug if this is done after a normal press dwell and immediately following the opening of the mould and/or removal of the mould assembly from the press and before the cell cover has completely cooled.

Some styles of cell covers require additional operations, but these are neither expensive nor time consuming. In the particular style shown, the perforation 9 is made by a drill during the inspection and cleaning up of the moulded cell covers. With cell covers in which the well is grooved or in which the tubular extension 10 is grooved, this is most conveniently done by a pair of drills during inspection and cleaning up. In application Serial No. 182,789, filed December 31, 1937, I have disclosed as an adjunct to a machine for grinding true the side and end edges of the skirts of storage battery cell covers, apparatus including reamers for reaming the cell cover perforations, for removing fins and the like. The addition of one or more drill stations to this line will accomplish the additional operations mentioned above.

Having thus described my invention what I claim as new and desire to secure by Letters Patent is:

1. A process of forming cell covers which comprises moulding a hard rubber composition in a mould under heat and pressure, a portion of said cell cover being moulded about a threaded plug having an irregular bottom forming part, the surface of said bottom forming part having a portion providing an inclined plane, the threads on said threaded plug being so disposed as to tend to remove said bottom forming part from the part formed by it, and removing said threaded plug from the moulded article by unscrewing it at a time when the composition of the moulded part surrounding said threaded plug is cured, but prior to the time it is completely cooled and hardened, whereby temporary elastic distortion occurring in the moulded part will permit the removal of said plug, in spite of the irregular conformation of the bottom forming part.

2. A process of forming cell covers which comprises moulding a hard rubber composition in a mould under heat and pressure, a portion of said cell cover being moulded about a threaded plug having an irregular bottom forming part, the surface of said bottom forming part having a portion providing an inclined plane, the threads on said threaded plug being substantially equal in pitch to the inclined plane on the surface of said bottom forming part, and accomplishing the removal of said cell cover from said mould, accompanied by rotation of said threaded plug to unscrew it after the composition of said cell cover is cured, but prior to the time it is completely cooled and hardened.

3. Apparatus for moulding cell covers including mould members and a threaded plug having a bottom forming part, the surface of said bottom forming part having a portion providing an inclined plane, said plug bearing threads, and the pitch of said threads being substantially equal to the angle of inclination of the inclined plane on the surface of said bottom forming part.

OLIVER O. RIESER.